United States Patent
Mizushima et al.

(10) Patent No.: US 6,733,858 B2
(45) Date of Patent: May 11, 2004

(54) OPTICAL RECORDING MEDIUM AND OPTICAL RECORDING METHOD THEREFOR

(75) Inventors: Tetsuro Mizushima, Tokyo (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/968,548

(22) Filed: Oct. 2, 2001

(65) Prior Publication Data

US 2002/0039635 A1 Apr. 4, 2002

(30) Foreign Application Priority Data

Oct. 3, 2000 (JP) ........................................ 2000-303674

(51) Int. Cl.$^7$ ................................................ B32B 3/02
(52) U.S. Cl. .................... 428/64.1; 428/64.5; 428/64.6; 430/270.13
(58) Field of Search .............................. 428/64.1, 64.4, 428/64.5, 64.6, 913; 430/270.13, 495.1, 945; 369/283, 288

(56) References Cited

U.S. PATENT DOCUMENTS

| | | | | |
|---|---|---|---|---|
| 6,096,399 | A | * 8/2000 | Yoshinari | .................... 428/64.1 |
| 6,296,915 | B1 | * 10/2001 | Yusu | ......................... 428/64.1 |
| 6,312,780 | B1 | * 11/2001 | Kasami | ..................... 428/64.1 |
| 6,479,121 | B1 | * 11/2002 | Miura | ....................... 428/64.1 |
| 2001/0033991 | A1 | * 10/2001 | Zhou | ..................... 430/270.13 |

FOREIGN PATENT DOCUMENTS

| | | |
|---|---|---|
| JP | 01-092937 | 4/1989 |
| JP | 05-342629 | 12/1993 |
| JP | 06-195747 | 7/1994 |
| JP | 10-226173 | 8/1998 |
| JP | 11-073692 | 3/1999 |
| JP | 11-185289 | 7/1999 |
| JP | 2000-149322 | 5/2000 |
| WO | WO98/47142 | 10/1998 |

OTHER PUBLICATIONS

U.S. patent application Ser. No. 09/968,530, filed Oct. 2, 2001.
U.S. patent application Ser. No. 09/968,548, filed Oct. 2, 2001.

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

Provided is a medium having a phase change recording layer wherein crystallization of the recording layer is facilitated, and at the same time, wherein the region to be crystallized is crystallized at an accurate dimension. The optical recording medium has a recording layer 4 comprising at least one phase change layer 41 and at least one functional layer 42 in contact with said phase change layer. The phase change layer 41 in its as-deposited state is amorphous, and crystals having Fm3m structure or R3m structure are produced upon crystallization of this layer. The functional layer 42 in its as-deposited state is crystalline, and contains crystals having Fm3m structure. The material used for the functional layer 42 is the one which exhibits a thermal conductivity of 0.03 to 5 W/cmK as measured in thin film form of 100 nm thick.

17 Claims, 9 Drawing Sheets

FIG. 1

LASER BEAM

OPTICAL RECORDING MEDIUM AND OPTICAL RECORDING METHOD THEREFOR

BACKGROUND OF THE INVENTION

This invention relates to an optical recording medium having a phase change layer and a method for recording information in such medium.

Highlight is recently focused on optical recording media capable of recording information at a high density. Typical optical recording mediums are write once media which can be recorded only once and which can not be rewritten, and rewritable media wherein repeated rewriting has been enabled. Improvement in the recording density and increase in the data transmission rate are always required for an optical recording medium.

Of the rewritable recording media, those of phase change type are recorded by changing the crystalline state of the recording layer by irradiating a laser beam, and read by detecting the change induced in the recording layer by such change in reflectivity in the crystalline state.

In the phase change medium which can be rewritten by overwriting, amorphous record marks are formed by irradiating the medium with a laser beam of recording power level to melt the crystalline recording layer and quenching the molten recording layer to thereby form the amorphous record marks. In the erasure, the medium is irradiated with a laser beam of erasing power level to heat the recording layer to a temperature of not less than the crystallization temperature and less than the melting temperature followed by gradual cooling to thereby crystallize the amorphous record marks. Accordingly, the overwriting can be accomplished by irradiating a single laser beam with its intensity modulated. In the recording of such phase change medium at a high speed, the rate determining factor is crystallization speed of the recording layer, namely, the transformation speed from the amorphous to the crystalline state. The change from the crystalline to the amorphous states can be accomplished within the period of several nano seconds while crystallization from the amorphous to the crystalline state requires maintenance at a temperature at or above the crystalline temperature for at least a predetermined period.

An as-deposited phase change layer is generally amorphous. In the meanwhile, record marks formed by melting and quenching the crystalline recording layer are also amorphous. The as-deposited phase change layer and the amorphous record marks share the common feature that they are amorphous. The amorphous state of the as-deposited amorphous recording layer, however, is more stable than the amorphous record marks, and even when the as-deposited phase change medium were overwritten as described above, crystallization of the region which had been irradiated with the laser beam of erasing power level is difficult. Accordingly, there is a need to complete the initialization of the recording layer (initialization of the entire surface) before the overwriting operation. If the initialization is difficult, production cost will be increased since the initialization should be conducted by using a laser beam of higher power and at a lower speed. Also known is a write once medium wherein crystalline record marks are formed in the as-deposited recording layer, namely, in the amorphous recording layer. The crystallization of the as-deposited recording layer is quite difficult as described above, and there is a high demand for a means capable of readily crystallizing the as-deposited amorphous recording layer. In addition, if amorphous record marks can be crystallized (erased) at a higher speed, data transfer rate in the overwriting operation can be increased.

Various proposals have been made to facilitate crystallization of the as-deposited amorphous recording layer or to speed up the erasure of the record marks. Proposals include provision of a layer in contact with the recording layer for promoting the crystallization of the recording layer, and constitution of the recording layer from a laminate of layers.

For example, JP-A 92937/1989 discloses an optical recording medium comprising a recording layer containing Te or Se as its main component and a crystal nucleus-forming layer in contact with the recording layer, wherein apparent speed of nuclei formation near the melting point has been increased. There is also disclosed that the increase in the apparent nuclei formation speed of the recording layer enables erasure of the record marks at a higher speed. In claim 4 of JP-A 92937/1989, there is described that the crystal nucleus-forming layer is amorphous immediately after the production of the optical recording medium, and once crystallized by laser beam irradiation, the layer never becomes amorphous or immediately crystallized upon irradiation with the laser beam. In other words, the stable phase for this crystal nucleus-forming layer is the crystalline phase once the layer has been crystallized even if the layer went through repeated recording and erasing operations. JP-A 92937/1989 also describes that it is preferable that the crystalline phase of the crystal nucleus-forming layer after its crystallization is the same as the crystalline phase of the recording layer. Examples of JP-A 92937/1989 disclose combination of the recording layer comprising $Te_{57}In_{18}Au_{25}$ and the crystal nucleus-forming layer comprising $Te_{67}Au_{33}$.

WO98/47142 discloses an optical information recording medium wherein a crystallization-promoting layer is provided in contact with the recording layer comprising a Ge-Sb-Te-based alloy. This crystallization-promoting layer has a crystal structure of face centered cubic lattice which is the same as that of the recording layer, or a rhombohedral lattice which does not include Te. Initialization of the recording layer is not required in this medium since the recording layer is crystallized at the time of its formation owing to the provision of the crystallization-promoting layer and the recording layer in contact with each other. There is disclosed that the adjacent crystallization-promoting layer and recording layer turns out to be in mixed state. In Examples of WO98/47142, the recording layer comprises a composition based on $Ge_2Sb_2Te_5$, and the crystallization-promoting layer contains PbTe, $Bi_2Te_3$, Sb, or Bi. In Comparative Examples, the crystallization-promoting layer contains W (body centered cubic lattice), Te (hexagonal system), $Sb_2TeSe_2$ (rhombohedral lattice), $Sb_2Te_3$ (rhombohedral lattice), or $Ag_2Te$ (monoclinic system), CrTe (hexagonal system).

JP-A 185289/1999 discloses a write once optical information-recording medium which has a phase change recording layer on at least one surface of the substrate, and a layer comprising a semiconductor material immediately on and/or under the recording layer. In this medium, when the recording layer is crystallized, the shape of the unit cell constituting the crystal face parallel to the substrate in the recording layer matches with the shape of the unit cell constituting the most dense face of the semiconductor material layer. The invention described in JP-A 185289/1999 attempts to reduce the jitter by providing such semiconductor material layer, and adequately selecting the material used for each layer so that absolute value of the lattice mismatch between the recording layer and the semiconductor material layer does not exceed 10%. JP-A 185289/1999 does not explicitly indicate the crystallization-promoting effect realized by providing the semiconductor material layer in contact with the recording layer. JP-A 185289/1999, however, describes that it has been estimated that, when the recording layer had been crystallized, deformation of the lattice that takes place at the boundary with the adjacent layer prevents crystallization, and hence, invites increase in the jitter. The compounds indicated in JP-A 185289/1999 as exemplary compounds for use in the semiconductor material layer include BaO, AgCl, BeTe, GaAs, AlAs, YSb, YP, ZnSe, ThS, SnAs, YSe, AgBr, ThP, LaS, ScSb, ThSe, CaSe, PbS, ScBi, ThAs, BiSe, InAs, YTe, GaSb, PbSe, SnSb, AlSb, CuI, SrSe, SnTe, ThSb, CaTe, BaS, LaTe, PbTe, BiTe, SrTe, AgI, InSb, CdTe, $Sb_2Te_3$, $Bi_2Se_3$, and $Bi_2Te_3$. The materials indicated for use in the recording layer include alloys containing at least one of Te, Sb and Se, among which Te—Ge—Sb alloys and In—Sb—Te—Ag alloys being indicated as the most preferable. The In—Sb—Te—Ag alloy used in the Examples is $Ag_{2.6}In_{3.7}Sb_{64.2}Te_{29.5}$. In the medium described in JP-A 185289/1999, crystalline pits (record marks) are formed in the amorphous recording layer. It should be noted that, unlike the WO98/47142, JP-A 185289/1999 does not explicitly refer to the state of the semiconductor material layer after completion of the medium. JP-A 185289/1999, however, discloses that it is not the interdiffusion between the recording layer and the compound semiconductor layer that takes place.

JP-A 226173/1998 discloses an optical recording medium which has a recording layer comprising a laminate of a Sb-based thin layer containing Sb as its main component and a reactive thin layer containing In, Ag and Te (and optional Sb) as its main components or Ge and Te (and optional Sb) as its main components, and wherein the mixing of both thin layers generates a phase change material. In this medium, the treatment of mixing both thin layers is generally conducted after forming the recording layer by continuously irradiating the layer with a laser beam. In the area where the layers have been mixed, the amorphous phase such Ag—Sb—Te phase is dispersed in the Sb crystalline phase, and the reflectively is lower than that before the mixing but higher than the amorphous region (record marks). The medium is overwritten after the mixing treatment by the procedure normally used in a phase change medium. In the region which has been irradiated with the laser beam of erasing power level, crystallization into $AgSbTe_2$ takes place to increase the reflectivity.

JP-A 73692/1999 discloses an optical recording medium which has a recording layer comprising a laminate of a Te-based thin layer containing Te as its main component and reactive thin layer containing Ge and/or Sb as its main component, and wherein the mixing of both thin layers generates a phase change material. In this medium, the treatment of mixing both thin layers is conducted after forming the recording layer by continuously irradiating the layer with a laser beam. In the area where the layers have been mixed, the amorphous phase such as Ge—Sb phase is dispersed in the Te crystalline phase, and the reflectively is lower than that before the mixing but higher than the amorphous region (record marks). The medium is overwritten after the mixing treatment by the procedure normally used in a phase change medium. In the region which has been irradiated with the laser beam of erasing power level, crystallization into $GeTe_2$ or $Sb_2Te_3$ takes place to increase the reflectivity.

JP-A 342629/1993 discloses an information recording medium wherein a high speed initialization has been enabled by providing an easily crystallizable auxiliary layer in contact with the recording layer comprising a phase change material. In this medium, the auxiliary layer has a composition containing at least 50 atom % of Se or at least 70 atom % of Te, and average composition of the auxiliary layer and the recording layer is $Ge_2Sb_2Te_5$, $GeSb_2Te_4$, or $In_3SbTe_2$. In other words, the auxiliary layer and the recording layer of this medium reacts with each other to thereby constitute a normal composition of the phase change material.

In addition to the layers as described above, it is also known to use a non-metal layer for the purpose of promoting the crystallization of the amorphous phase change layer.

For example, JP-A 149322/2000 discloses a non-initialized phase change optical recording medium comprising a phase change layer and a crystallization-inducing layer provided in contact with the phase change layer. This crystallization-inducing layer is a light-transmitting layer which is crystalline. JP-A 149322/2000 discloses that overwriting of the as-deposited recording layer is enabled by the provision of the crystallization-inducing layer. JP-A 149322/2000 also indicates that, surface of a crystalline thin film generally function as crystallization nuclei when the crystalline thin film is provided in contact with an amorphous thin film, and JP-A 149322/2000 makes use of this function. JP-A 149322/2000 indicate use of cerium oxide and zinc sulfide for the crystallization-inducing layer, and also, use of a ternary alloy comprising Ge, Sb and Te such as $Ge_2Sb_2Te_5$ and a ternary alloy comprising In, Sb and Te for the recording layer.

SPIE Vol. 3401, 24–32 and JP-A 195747/1994 disclose that crystallization speed of the phase change layer can be increased by providing a layer of germanium nitride or silicon nitride in contact with the phase change layer having the composition near $Ge_2Sb_2Te_5$.

As described above, it has been known to provide a layer in contact with the recording layer for the purpose of promoting the crystallization of the recording layer. The inventors of the present invention, however, found that the crystallization-promoting layers used in the prior art as described above were often insufficient in promoting the crystallization, or caused excessive influence in the heat transfer in the medium to invite partial amorphizing of the region which should be crystallized. In addition, the recording layer of the prior art medium was often constituted from a plurality of layers and the initialization was promoted by mixing or reacting of such layers. In such a case, the crystallization-promoting effects were lost once the recording layer was initialized, and the erasing (recrystallization) speed of the amorphous record marks could not be increased.

SUMMARY OF THE INVENTION

The present invention has been completed in view of such situation, and an object of the present invention is to provide a medium having a phase change recording layer wherein crystallization of the recording layer is facilitated, and at the same time, wherein the region to be crystallized can be crystallized at an accurate dimension.

Such objects are attained by the present invention as described in (1) to (5), below.

(1) An optical recording medium having a recording layer comprising at least one phase change layer and at least one functional layer in contact with said phase change layer, wherein the phase change layer is amorphous in its as-deposited state, and crystals having Fm3m structure or R3m structure are produced upon crystallization of the phase change layer, and the functional layer is crystalline in its as-deposited state containing crystals having Fm3m structure, and the material constituting the functional layer is the one which exhibits a thermal conductivity of 0.03 to 5 W/cmK as measured in thin film form of 100 nm thick.

(2) An optical recording medium having a recording layer comprising at least one phase change layer and at least one functional layer in contact with said phase change layer, wherein the phase change layer is amorphous in its as-deposited state, and crystals having Fm3m structure or R3m structure are produced upon crystallization of the phase change layer, and the functional layer is crystalline in its as-deposited state containing crystals having Fm3m structure, and the functional layer contains at least one element selected from Al, Cu, Ag, Au, Ni, Pd, Pt and Rh as its main component at a content of 60 to 100 atom %, and the functional layer is free from metal elements of Groups 15(Vb) and 16(VIb).

(3) An optical recording medium according to the above (1) or (2) wherein said phase change layer has a composition in atomic ratio of:

$$(Sb_xTe_{1-x})_{1-y}M_y \quad (I)$$

wherein M represents elements other than Sb and Te, and x and y satisfy the relations:

$$0.55 \leq x \leq 0.90,$$

and $$0 \leq y \leq 0.25.$$

(4) An optical recording method for recording the optical recording medium of any one of the above (1) to (3), wherein crystalline record marks are formed by irradiating the amorphous phase change layer with a single laser beam whose intensity is modulated.

(5) An optical recording method for recording the optical recording medium of any one of the above (1) to (3), wherein amorphous record marks are formed by irradiating the crystalline phase change layer with a single laser beam whose intensity is modulated.

DETAILED DESCRIPTION OF THE INVENTION

The medium of the present invention is a rewritable or write once phase change medium, and the medium of the present invention has a recording layer which includes a phase change layer and a functional layer. The phase change layer contains a phase change material. The as-deposited phase change layer is amorphous, and crystals of Fm3m structure or R3m structure are generated upon crystallization of the phase change layer. The functional layer is provided in contact with the phase change layer, and the as-deposited functional layer is crystalline comprising the crystals of Fm3m structure. The medium of the present invention is applicable to a method wherein the phase change layer formed as an amorphous layer is initialized and amorphous record marks are formed on the initialized layer, or alternatively, a method wherein crystalline record marks are formed in the as-deposited amorphous phase change layer.

In the present invention, the functional layer and the phase change layer are combined so that the functional layer effectively functions as crystal nuclei for the crystallization of the phase change layer such that the crystallization speed is increased more than twice by the provision of the function layer. This enables use of a linear velocity which is more than twice faster than that used for the conventional medium in the erasing of the amorphous record marks, and in turn, use of a significantly high data transfer rate in the overwriting. Also facilitated is the initialization of the phase change layer, and the initialization can be accomplished at a quite high speed. In the case of the method wherein crystalline record marks are formed in the amorphous phase change layer, the combination of the functional layer and the phase change layer facilitates smooth formation of the record marks at a quite high speed.

It is to be noted that the metal elements of Groups 15(Vb) and 16(VIb), and in particular, the elements (i.e. Sb, Bi and Te) which tends to react with the elements found in the phase change layer and the elements constituting the phase change layer are likely to react with the phase change layer at a relatively low temperature. Therefore, if the functional layer contains such elements, the functional layer is likely to react with the phase change layer when the medium is irradiated with the laser beam for the crystallization to result in the change of the composition of the phase change layer. In view of such situation, it is preferable in the present invention to avoid use of such elements as the main components in the functional layer, and it is still more preferable to avoid inclusion of such elements in the functional layer.

The material used in the present invention for the functional layer may have a thermal conductivity of 0.03 to 5 W/cmK as measured in thin film form of 100 nm thick. Accordingly, the semiconductor materials as described in JP-A 185289/1999, supra, namely an alloy containing Sb, Bi, Te and the like as its main components can not be used for the functional layer of the present invention because of the insufficient thermal conductivity when the layer is formed in the form of a thin film. If the thermal conductivity of the material used for the functional layer is too low, accumulation of excess heat in the phase change layer is likely to take place during the crystallization of the phase change layer by heating of the laminate of the phase change layer and the functional layer. The accumulation of excess heat is most likely to take place when a laser beam of short wavelength is irradiated in an optical system having a large NA (numerical aperture) since energy density increases in the laser beam spot on the surface of the phase change layer. For example, when a relatively long region is to be crystallized in the method wherein crystalline record marks are formed in the amorphous phase change layer, an excessive heat may accumulate near the tail of the crystallization target region and the tail region may become amorphous, and in such case, the crystallized region of predetermined length is never provided. An excessively low thermal conductivity of the material used for the functional layer of the present invention may also invite an inconvenience in the initialization of the medium. To be more specific, the initialization is typically accomplished by a bulk eraser which uses a laser beam of large diameter and there are some overlap in the region irradiated by the laser beam. If the heat tends to accumulate in the phase change layer, the region of irradiation overlapping may become amorphous to fail to provide a normally initialized medium. In the case of the method wherein amorphous record marks are erased in the overwriting, such heat accumulation in the phase change layer is likely to result in an incomplete erasing.

The method wherein crystalline record marks are formed in the amorphous recording layer is associated with difficulty of tracking servo during the recording due to the low reflectivity of the phase change layer. In order to facilitate the tracking servo, the functional layer may preferably have an increased reflectivity, and for such high reflectivity, the functional layer may have an extinction coefficient (imaginary part k of complex index of refraction n+ki) at the recording/reading wavelength of at least 1.5.

In the present invention, the functional layer is formed as a crystalline metal layer, and as will be described below, the phase change layer is preferably a layer comprising Sb and Te as its main components. The phase change layer comprising Sb and Te as its main components, for example, the layer wherein Sb:Te is 7:3 is different from the recording layer comprising a Ge—Sb—Te—based alloy, namely the layer having a composition of $Ge_2Sb_2Te_5$ in that crystallization from boundary surfaces (for example, the boundary surface with the functional layer) is predominant (see Technical Digest of ODS2000 74–76). In such a case, if a functional layer in the form of a crystalline layer is present in contact with the phase change layer, crystallization of the phase change layer will be greatly promoted by the functional layer owing to the greater contact area between the phase change layer and the functional layer compared to the case of the amorphous functional layer because of the coarser surface of the crystalline functional layer.

Next, the medium of the present invention is described in detail by referring various parts thereof.

Figure 1:
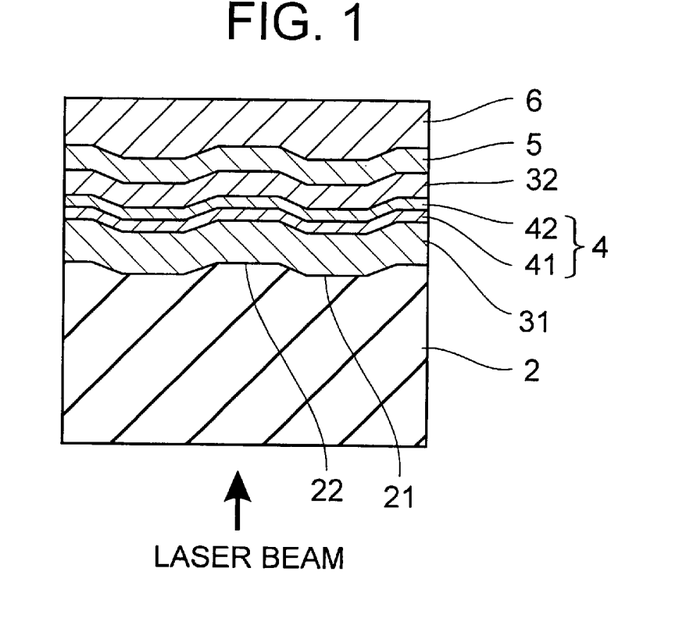
FIG. 1 is a partial cross sectional view of the optical recording medium according to an embodiment of the present invention.

Structure Shown in FIG. 1

An embodiment of the optical recording medium of the present invention is shown in FIG. 1. This optical recording medium comprises a light-transmitting substrate 2, and a first dielectric layer 31, a recording layer 4, a second dielectric layer 32, a reflective layer 5, and a protective layer 6 deposited on the light-transmitting substrate 2 in this order.

The laser beam for recording or reading enters the medium through the light-transmitting substrate 2.

Light-transmitting Substrate 2

The light-transmitting substrate 2 is transparent to the laser beam used for recording or reading. The thickness of the light-transmitting substrate 2 is generally in the range of 0.2 to 1.2 mm, and preferably, in the range of 0.4 to 1.2 mm, and the light-transmitting substrate 2 may typically comprise a resin, or alternatively, a glass. The grooves (guide grooves) 21 generally provided on the optical recording medium are the regions located closer to the side of the laser beam incidence and the raised regions defined between two adjacent grooves are the lands 22.

In the present invention, the lands and/or grooves may be used for the recording track.

First Dielectric Layer 31 and Second Dielectric Layer 32

Figure 2:
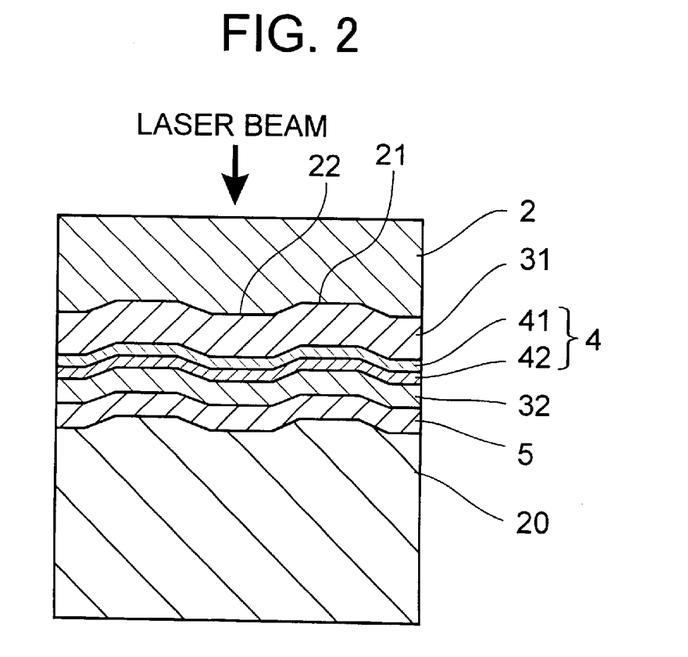
FIG. 2 is a partial cross sectional view of the optical recording medium according to another embodiment of the present invention.
Figure 3:
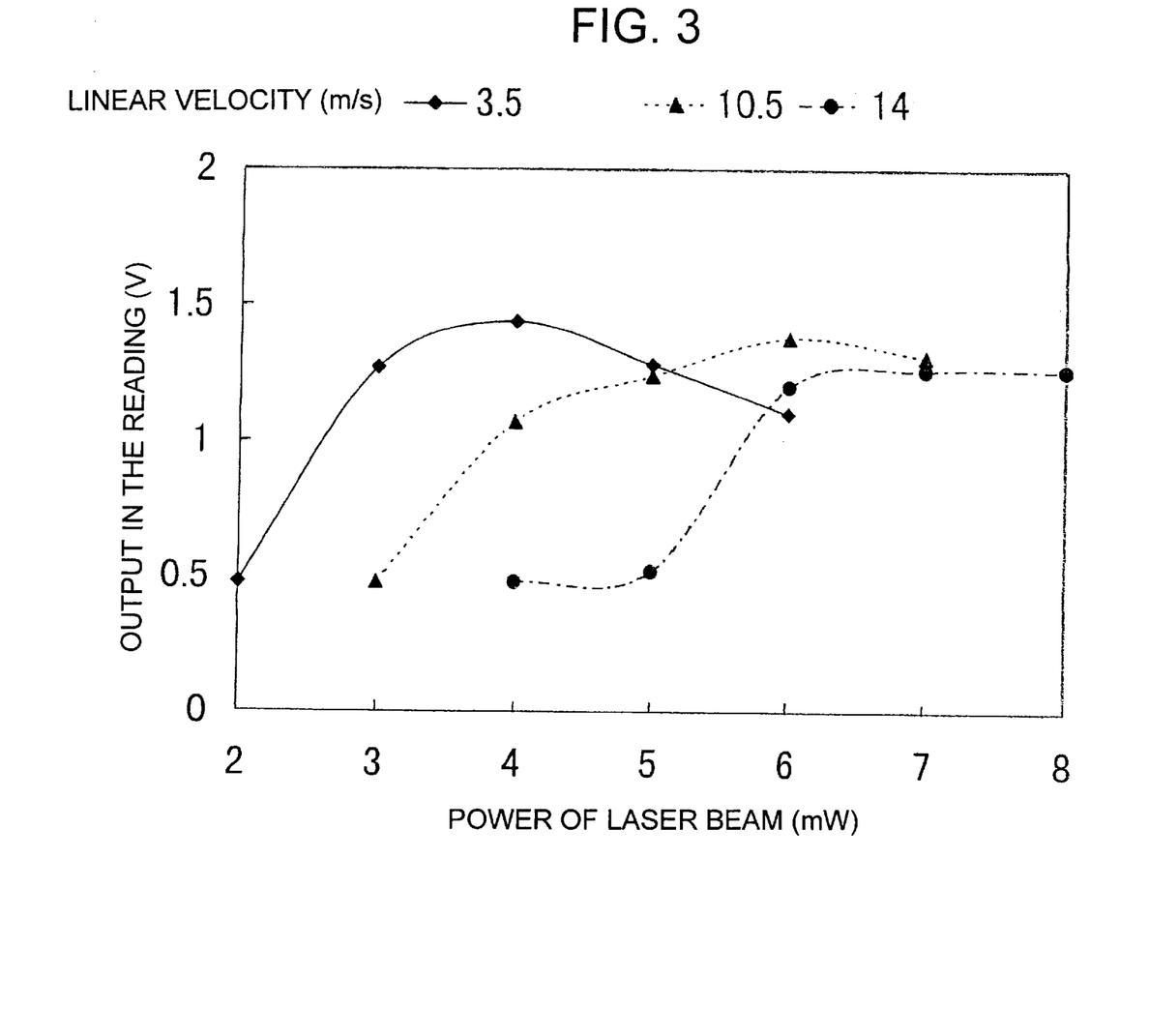
FIG. 3 is a graph showing the output after heating in relation to the power of the laser beam used for the heating of the phase change layer at various linear velocities.
Figure 4:
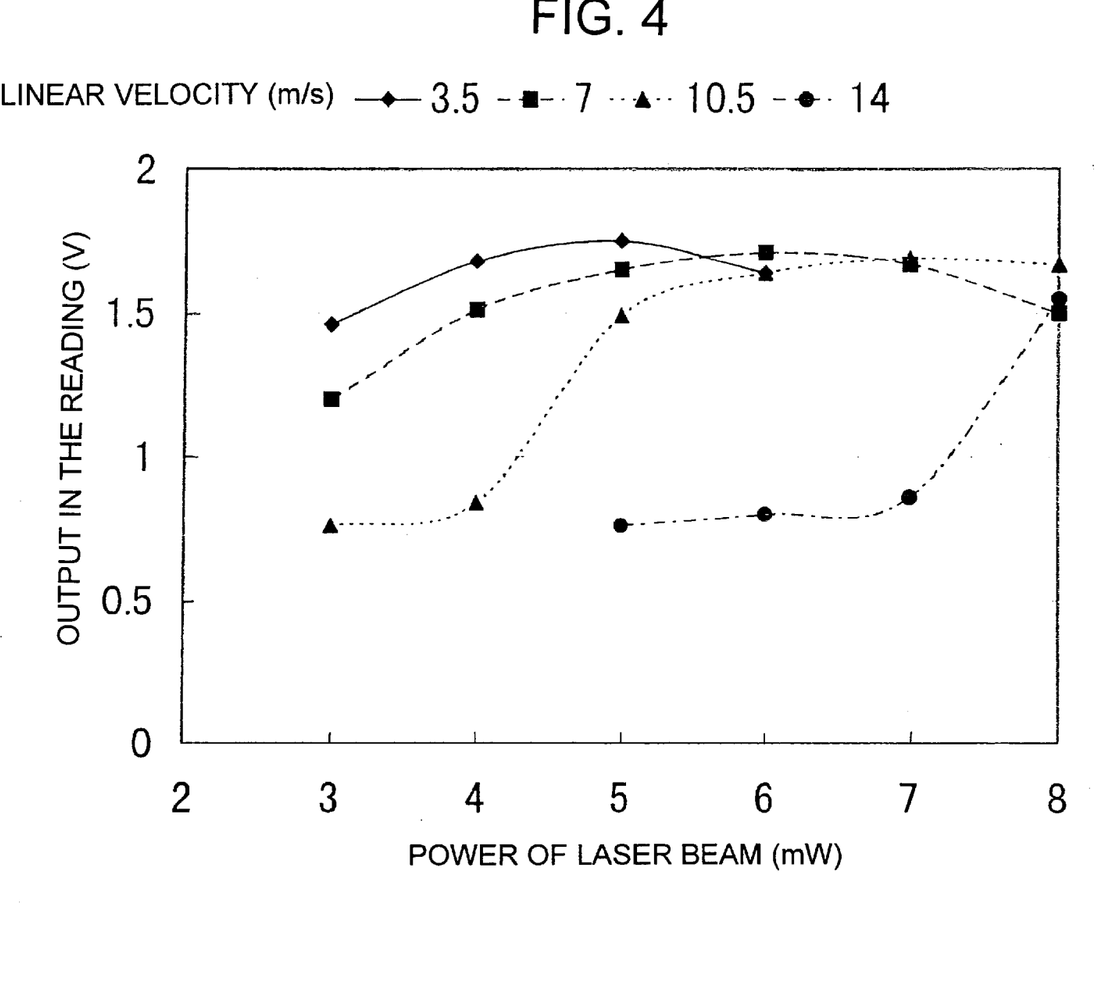
FIG. 4 is a graph showing the output after heating in relation to the power of the laser beam used for the heating of the phase change layer at various linear velocities.
Figure 5:
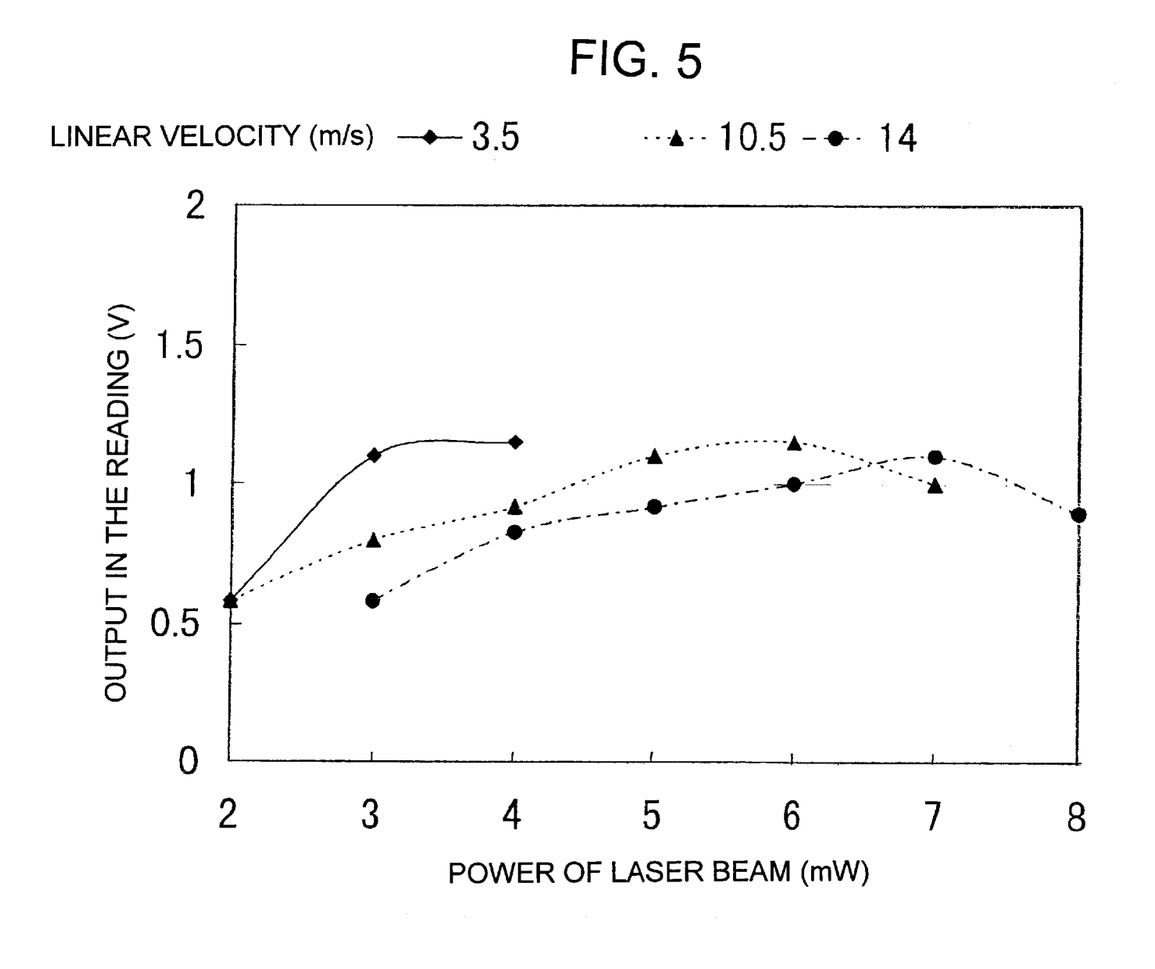
FIG. 5 is a graph showing the output after heating in relation to the power of the laser beam used for the heating of the phase change layer at various linear velocities.
Figure 6:
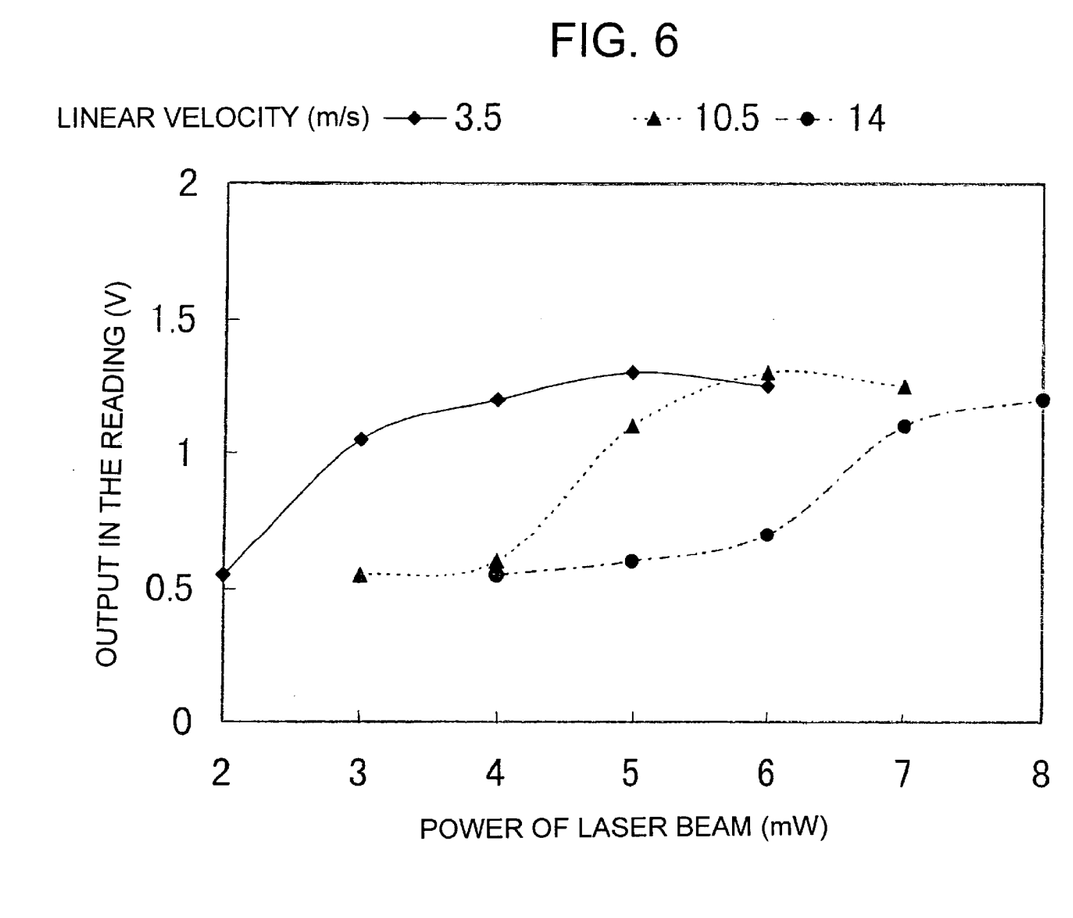
FIG. 6 is a graph showing the output after heating in relation to the power of the laser beam used for the heating of the phase change layer at various linear velocities.

These dielectric layers prevent oxidation and degradation of the recording layer 4, and also, protect the light-transmitting substrate 2 or the supporting substrate 20 shown in FIG. 2 from the heat transmitted from the recording layer during the recording by blocking the heat or by dissipating such heat in in-plane direction of the layer. Provision of the dielectric layers also contributes for improving the degree of modulation. Each dielectric layer may also comprise a laminate of two or more dielectric layers each having different compositions. The second dielectric layer may not be provided when no reflective layer is provided.

The dielectric material used for these dielectric layers is preferably a compound containing at least one metal component selected from Si, Ge, Zn, Al, and rare earth metals, and the material is preferably an oxide, a nitride, or a sulfide. A mixture containing two or more of the foregoing may also be used.

The thickness of the first and the second dielectric layers may be adequately determined so that sufficient improvement in the protection and degree of modulation are achieved. However, the first dielectric layer 31 is preferably deposited to a thickness of 10 to 300 nm, and the second dielectric layer 32 is preferably deposited to a thickness of 5 to 100 nm.

The dielectric layers are preferably formed by sputtering.

Recording Layer 4

The recording layer comprises at least one phase change layer and at least one functional layer which is in contact with the phase change layer. The recording layer 4 shown in the drawings comprises a phase change layer 41 and a functional layer 42.

The phase change layer 41 is not particularly limited for its composition, and the material used may be adequately selected from various phase change materials, and preferably, from those containing at least Sb and Te. However, crystallization temperature of the recording layer containing Sb and Te as the only components is as low as about 130° C., and the storage reliability is insufficient. For the increase in the crystallization temperature, the recording layer may preferably comprise elements other than Sb and Te. Such element is preferably at least one element selected from In, Ag, Au, Bi, Se, Al, P, Ge, H, Si, C, V, W, Ta, Zn, Ti, Sn, Pb, Pd, and rare earth elements (Sc, Y, and lanthanoids), and among these, the preferred is at least one element selected from rare earth elements, Ag, In, and Ge in view of the particularly high effect in improving the storage reliability.

As described above, the functional layer is preferably formed as a crystalline layer. The crystallization promoting effects of the crystalline functional layer is particularly notable when the phase change layer has a composition including Sb and Te as its main component but not in the case when composition is based on $Ge_2Sb_2Te_5$. Preferably, the composition containing Sb and Te as its main components is the one as described below, namely, the composition represented by the formula (I):

$$(Sb_xTe_{1-x})_{1-y}M_y \qquad (I)$$

wherein M represents the element other than Sb and Te, and atomic ratio of the elements constituting the phase change layer is preferably such that:

$$0.55 \leq x \leq 0.90,$$

and $$0 < y < 0.25.$$

and more preferably, $$0.55 \leq x \leq 0.85,$$

and $$0.01 \leq y \leq 0.20.$$

When x representing the content of Sb is too small in the formula (I), crystallization speed will be excessively low, and also, signal output will be low since reflectivity of the crystalline area in the phase change layer will be low. In addition, when x is extremely low, recording will be difficult. On the other hand, when x is too large, difference in reflectivity between the crystalline phase and the amorphous phase will be insufficient.

The element M is not particularly limited. However, it is preferable to select at least one member from the above-indicated elements for the M in view of storage reliability. The y representing the content of the element M is preferably within the above-specified range since an excessively large y results in the reduced crystallization speed.

The phase change layer is preferably formed to a thickness of more than 4 nm to 50 nm, and more preferably, to a thickness of 5 nm to 30 nm. When the phase change layer is too thin, growth the crystalline phase will be difficult rendering the crystallization difficult. When the phase change layer is too thick, the phase change layer will have an increased heat capacity to render the recording difficult. An excessively thick recording layer also results in the reduced output of signal.

The phase change layers are preferably formed by sputtering.

The phase change layer of the present invention is a layer which is mainly constituted from crystals of Fm3m structure or R3m structure after crystallization. Preferably, the phase change layer comprises solely from such crystals, and more preferably, the phase change layer is a single phase layer comprising either one of such crystals. Typical examples of such phase change layer are those having a composition containing Sb and Te as the main components, and to be more specific, those having the composition represented by the formula (I). In the case of a phase change layer which crystallizes into Fm3m structure or R3m structure, the crystallization is likely to take place so that the (111) face is substantially parallel to the in-plane direction of the layer. Accordingly, the functional layer of the present invention is a layer which is crystalline in as-deposited state, and at the same time, which mainly comprises crystals having Fm3m structure, and preferably comprises single phase of such crystals, and more preferably, wherein (111) face, namely, the closest packing face of the crystals having Fm3m structure extends in parallel with the in-plane direction of the layer. When such functional layer is combined with the phase change layer as described above, the functional layer functions extremely well as the crystal nuclei for the crystallization of the phase change layer, and provision of the functional layer increases the crystallization speed more than twofold. Provision of the functional layer, therefore, is particularly effective for crystallization of the as-deposited phase change layer whose crystallization is difficult.

As described above, this invention employs a method wherein amorphous record marks are formed in the initialized crystalline phase change layer, or a method wherein crystalline record marks are formed in the amorphous phase change layer. In the medium used in such methods, and in particular, in the medium used in the method wherein amorphous record marks are formed, the functional layer is preferably formed from a material which has a relatively high melting point so that the functional layer does not react with the phase change layer in the formation of the record marks. The material actually used for the functional layer may be selected depending on the material used for the phase change layer, and to be more specific, the material used for the functional layer with a phase change layer containing Sb and Te as its main components is preferably the one having a melting point of preferably at least 550° C., and more preferably at least 650° C. In addition, metal elements of Groups 15(Vb) and 16(VIb), and in particular, the elements (i.e. Sb, Bi and Te) which tends to react with the elements found in the phase change layer and the elements constituting the phase change layer are likely to react with the phase change layer at a relatively low temperature. Therefore, presence of such elements in the functional layer may invite change in the composition of the phase change layer through reaction between the functional layer and the phase change layer. In view of such situation, it is preferable to avoid use of such elements as the main components in the functional layer, and it is still more preferable to avoid inclusion of such elements in the functional layer.

In order to form a functional layer which mainly comprises crystals of Fm3m structure and which preferably comprises single phase of such crystals, the material used for the functional layer is preferably a metal (a simple substance or an alloy) which contains at least one metal element which has Fm3m structure at room temperature and which contains at least one of such metal elements as its main component. Preferable examples of such metal elements include Al, Cu, Ag, Au, Ni, Pd, Pt, and Rh. However, it should be noted that a metal of high melting point, for example, a metal having a melting point of 1000° C. or higher is associated with the difficulty in crystal growth during the sputtering, and it is quite difficult to form a thin film having a high crystallinity and good crystal orientation by using such metal. Accordingly, the most preferred among those mentioned above are Al and Ag which have relatively low melting points. For the purpose of increasing the crystallinity, the content of the main components is preferably in the range of 60 to 100 atom %, and in particular, 80 to 100 atom %. When the content of the main components is too low, a functional layer with a high crystallinity is less likely to be formed, and the effects of promoting the crystallization of the phase change layer will be insufficient. The subsidiary components, namely, the components other than the main components are not limited, and may be any element other than those of the main components. However, use of the metal elements of Groups 15(Vb) and 16(VIb), and in particular, use of Sb, Bi, and Te is preferably to be avoided for the reason as described above.

The functional layer may preferably have a thickness of 1 to 40 nm, and more preferably, a thickness of 2 to 30 nm. When the functional layer is too thin, the layer will not sufficiently function as the crystallization nuclei, while an excessively thick functional layer invites increase in the heat capacity of the functional layer rendering the recording difficult.

As described above, the functional layer may preferably have a high reflectivity, and to be more specific, the extinction coefficient at the recording/reading wavelength is preferably at least 1.5, and more preferably at least 2.0. Although there are no particular limitation for the extinction coefficient, the metal used for the functional layer normally has an extinction coefficient of not more than 10.

The material used for the functional layer may have a thermal conductivity of at least 0.03 W/cmK, and preferably at least 0.05 W/cmK as measured in thin film form of 100 nm thick for the reason as described above. However, the medium will experience decrease in the recording sensitivity when the material used for the functional layer has an excessively high thermal conductivity, and the material used for the functional layer may preferably have a thermal conductivity of not more than 5 W/cmK as measured in thin film form of 100 nm thick. The thermal conductivity of a thin film can be determined, for example, by calculation using Widemann-Franz law from the value of the electric resistance measured by four probe method.

The embodiment shown in the drawings has the phase change layer 41 on the side of the laser beam incidence. The order of the phase change layer 41 and the functional layer 42 is not limited, and an embodiment wherein the functional layer 42 is formed on the side of the laser beam incidence is also acceptable.

The recording layer may comprise one phase change layer and one functional layer, or alternatively, the recording layer may have two or more layers of at least one of the phase change layer and the functional layer. When the recording layer comprises a total of three or more layers of the phase change and functional layers, the recording layer may comprise the same even number of alternately disposed phase change layers and functional layers, or an odd number of alternately disposed phase change and functional layers with the uppermost and the lowermost layers being the same type. The recording layer will become too thick when too many layers are disposed, and therefore, the number of interface between the phase change layer and the functional layer in the recording layer is preferably limited to up to 10.

When the recording layer has a multi-layer structure comprising two or more phase change layers, the adjacent two phase change layers can be thermally insulated by a functional layer. For example, when two phase change layers are provided with an intervening functional layer, the phase change layers on the side of the recording beam incidence can be crystallized while the other phase change layer remains amorphous if the power of the recording beam is adequately controlled. When the thus crystallized area is used as the first record mark, and both phase change layer are irradiated by a recording beam of higher power for crystallization of both layers and the thus crystallized area is used for the second record mark, three-level recording is enabled. Multilevel recording with an increased number of levels can be realized by increasing the number of phase change layers.

Reflective Layer 5

In the present invention, the reflective layer may be formed from any desired material, and typically, from a metal or a semimetal such as Al, Au, Ag, Pt, Cu, Ni, Cr, Ti or Si as a simple substance or as an alloy containing at least one of such metals.

The reflective layer is typically deposited to a thickness of 10 to 300 nm. The reflectivity is less likely to be sufficient when the thickness is below such range, and deposition to a thickness beyond such range is economically disadvantageous since no substantial improvement in the reflectivity is attained by additional increase in the thickness. The reflective layer is preferably formed by vapor deposition such as sputtering and evaporation.

It is to be noted that, when a functional layer having a relatively high reflectivity is provided, provision of the reflective layer 5 may not be necessary.

Protective Layer 6

The protective layer 6 is provided for improving scratch resistance and corrosion resistance. Preferably, the protective layer is formed of an organic material, and typically, a radiation curable compound or a composition thereof which has been cured with radiation such as electron or UV radiation. The protective layer may generally have a thickness of about 0.1 to about 100 $\mu$m, and may be formed by conventional techniques such as spin coating, gravure coating, spray coating, and dipping.

Structure Shown in FIG. 2

FIG. 2 shows an embodiment of the optical recording medium of the present invention. This medium comprises a supporting substrate 20, and a reflective layer 5 comprising a metal or a semimetal, a second dielectric layer 32, a recording layer 4, a first dielectric layer 31, and a light-transmitting substrate 2 deposited on the supporting substrate 20 in this order. The laser beam for recording or reading enters the medium through the light-transmitting substrate 2. It should be noted that an intermediate layer comprising a dielectric material may be optionally provided between the supporting substrate 20 and the reflective layer 5.

The light-transmitting substrate 2 of this embodiment may comprise a resin plate or a glass plate of the thickness substantially equivalent to that of the light-transmitting substrate 2 of FIG. 1. However, when the high recording density is to be attained by increasing the NA of the recording/reading optical system, reduction in the thickness of the light-transmitting substrate 2 is highly desired. The thickness of the light-transmitting substrate is preferably in the range of 30 to 300 $\mu$m. When the light-transmitting substrate is too thin, the medium will suffer from the optical influence of the dust on the surface of the light-transmitting substrate. An excessively thick light-transmitting substrate, on the other hand, will result in the difficulty of enabling the high density recording by increasing the NA.

The thin light-transmitting substrate 2 may be provided, for example, by bonding a light-transmitting sheet comprising a light-transmitting resin on the first dielectric layer 31 by means of an adhesive or a pressure-sensitive adhesive, or by directly forming the light-transmitting resin layer on the first dielectric layer 31 by coating.

The supporting substrate 20 is provided for the purpose of maintaining the rigidity of the medium. The thickness and the material used for the supporting substrate 20 may be the same as the those used for the light-transmitting substrate 2 in the embodiment of FIG. 1, and the supporting substrate 20 may be either transparent or non-transparent. The grooves 21 may be provided by transcription of the shape of the grooves formed on the supporting substrate 20 to the layers formed thereon as shown in the drawings.

Other layers are the same as those described for the embodiment of FIG. 1.

EXAMPLES

Example 1

Sample No. 1

A sample of the optical recording disk having the structure similar to FIG. 1 was produced by the procedure as described below.

A light-transmitting substrate 2 in the form of a land-and-groove double spiral disk having a diameter of 120 mm and a thickness of 0.6 mm was prepared by injection molding polycarbonate. Grooves were simultaneously formed in the injection molding of the light-transmitting substrate 2 to a width of 0.6 μm and a depth of 65 nm at a pitch of 1.2 μm. The first dielectric layer 31 was formed by sputtering using ZnS and SiO$_2$ for the target at SiO$_2$/(ZnS+SiO$_2$) of 20 mole %. The first dielectric layer had a thickness of 100 nm.

The phase change layer 41 was an amorphous layer formed by sputtering to a thickness of 20 nm, and it had a composition in atomic ratio of:

$$(Te_{0.26}Sb_{0.74})_{0.9}(Ag_{0.6}In_{0.4})_{0.1}$$

The functional layer 42 was a crystalline layer formed by sputtering to a thickness of 5 nm, and it had a composition in atomic ratio of Al$_{98}$Cr$_2$. The functional layer 42 had an extinction coefficient of 6.0 at a wavelength of 634 nm. An electron diffraction analysis revealed that the phase change layer after the crystallization was of rhombohedral system, namely, R3m structure, and the functional layer as-deposited was of face centered cubic lattice, namely, Fm3m structure. The functional layer also showed the tendency of the (111) face to orient in parallel to the in-plane direction of the layer. An Al$_{98}$Cr$_2$ layer having a thickness of 100 nm which had been formed under the same conditions as the functional layer was measured to have a thermal conductivity of 0.3 W/cmK.

The second dielectric layer 32 was formed as in the case of the first dielectric layer 31 except that it was formed to a thickness of 35 nm. The reflective layer 5 was formed by sputtering to a thickness of 50 nm, and it had a composition in atomic ratio of Al$_{98}$Cr$_2$. The protective layer 6 was formed by spin coating a UV-curable resin and curing the coating by UV irradiation. The protective layer had a thickness of 5 μm.

Sample No. 2

Sample No. 2 was prepared by repeating the procedure of Sample No. 1 except that the position of the phase change layer 41 and the functional layer 42 was changed, namely, except that the functional layer 42 and the phase change layer 41 were formed on the first dielectric layer 31 in this order.

Sample No. 3

Sample No. 3 was prepared by repeating the procedure of Sample No. 1 except that the first dielectric layer 31 was deposited to a thickness of 70 nm, the second dielectric layer 32 was deposited to a thickness of 50 nm, the reflective layer 5 was deposited to a thickness of 70 nm, and the recording layer 4 was formed by depositing the first functional layer, the phase change layer, and the second functional layer in this order. The first and the second functional layers were the same as the functional layer 42 of the Sample No. 1, and the phase change layer was the same as the phase change layer 41 of the Sample No. 1.

Sample No. 4

Sample No. 4 was prepared by repeating the procedure of Sample No. 1 except that the functional layer 42 had a composition of Ag$_{98}$Pd$_1$Cu$_1$ (atomic ratio). The functional layer 42 had an extinction coefficient at the wavelength of 634 nm of 4.9. An electron diffraction analysis revealed that the as-deposited functional layer was of face centered cubic lattice, namely, Fm3m structure, and the functional layer showed the tendency of the (111) face to orient in parallel to the in-plane direction of the layer. A Ag$_{98}$Pd$_1$Cu$_1$ layer having a thickness of 100 nm which had been formed under the same conditions as the functional layer was measured to have a thermal conductivity of 1.7 W/cmK.

Sample No. 5 (Comparative Example)

Sample No. 5 was prepared by repeating the procedure of Sample No. 1 except that no functional layer 42 was provided.

Evaluation

The samples were evaluated on an optical disk evaluator to find the conditions at which the phase change layer could be crystallized. In the evaluation, the samples were heated by directly irradiating the sample with the laser beam under the conditions:

laser wavelength: 634 nm, numerical aperture: 0.6, linear velocity: the value shown in FIGS. 3 to 7, and laser power: the value shown in FIGS. 3 to 7, and the samples were then measured for the output when the samples were read by a laser beam at the power of 0.9 mW. The results for the Sample Nos. 1 to 5 are shown in the graphs of FIGS. 3 to 7, respectively. The graphs show the output in the reading in relation to the power of the laser beam used in the heating. The output in the reading corresponds to the reflectively, and an output in the reading of not less than 1 V can be deemed to indicate the crystallization of the phase change layer.

Figure 7:
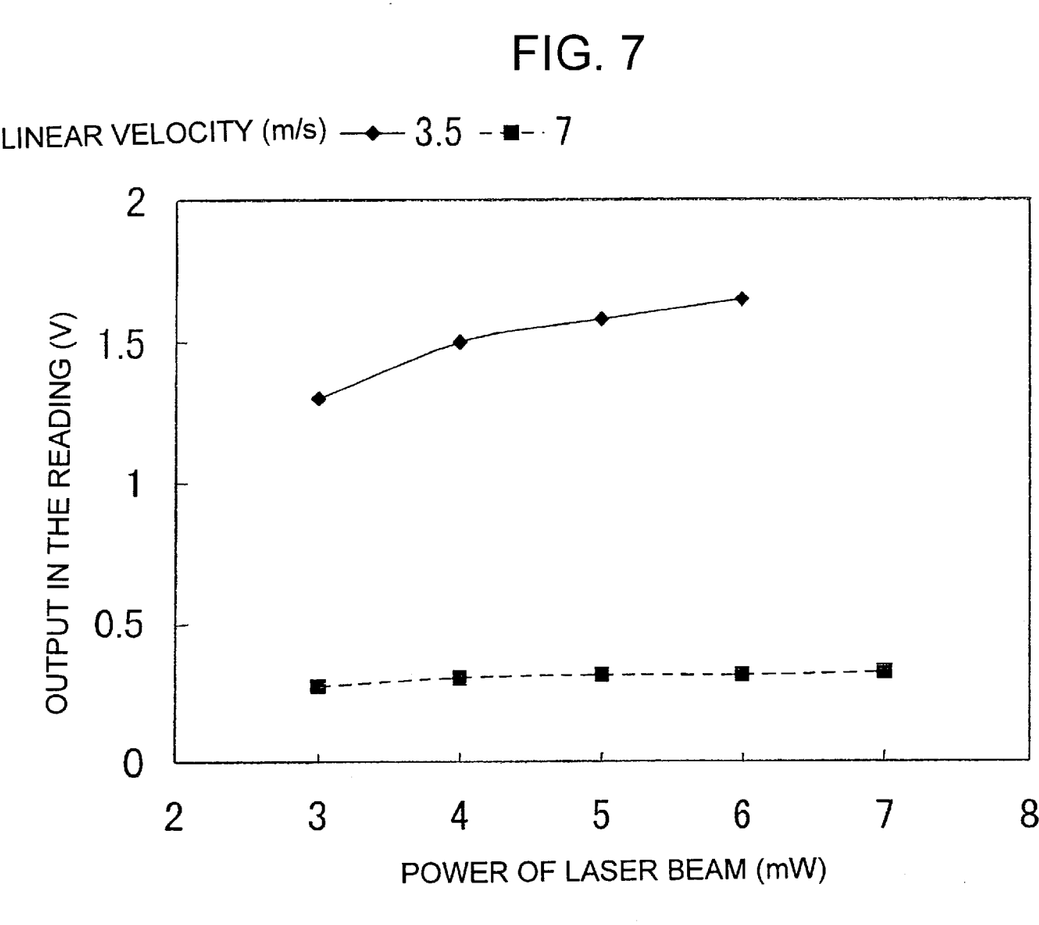
FIG. 7 is a graph showing the output after heating in relation to the power of the laser beam used for the heating of the phase change layer at various linear velocities.

The results shown in FIG. 7 for the Comparative Sample indicate that the crystallization of the phase change layer could be accomplished only when the linear velocity was 3.5 m/s in the absence of the functional layer, and the crystallization did not take place at the linear velocity of 7 m/s even if power of the laser beam were increased. In contrast, the results shown in FIGS. 3 to 6 indicate that the crystallization of the phase change layer could be accomplished even if the phase change layer had the same composition as that of the Comparative Sample and the linear velocity were increased to 14 m/s which is four times faster than that the Comparative Sample when a functional layer was provided and the laser beam of an adequate power corresponding to the linear velocity was used. These results indicate that provision of a functional layer according to the present invention facilitates smooth crystallization of the as-deposited phase change layer which is the one extremely difficult to crystallize.

Example 2

Sample No. 6

Sample No. 6 was prepared by repeating the procedure of Sample No. 1 except that the functional layer had a thickness of 10 nm.

Evaluation

Figure 8:
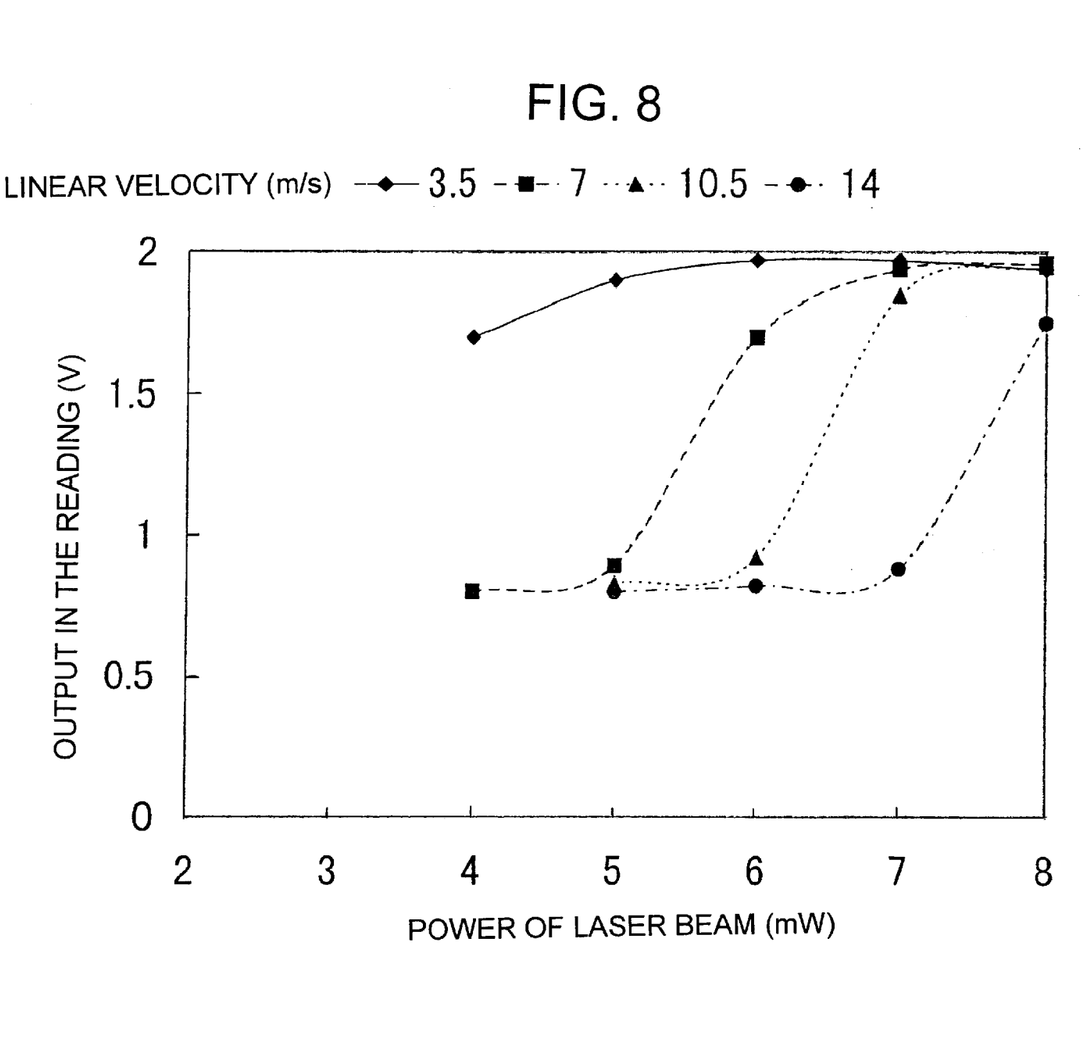
FIG. 8 is a graph showing the output after heating in relation to the power of the laser beam used for the heating of the phase change layer at various linear velocities.

Samples No. 6 was evaluated as in the case of Example 1 to find the conditions at which the phase change layer could be crystallized. The results are shown in the graphs of FIG. 8. Comparison between FIGS. 8 and 7 reveals that sufficient crystallization promoting effects are also achieved in Samples No. 6.

Next, Sample No. 6 having a crystallized phase change layer was recorded with a single signal at a linear velocity of 14 m/s on an optical disk evaluator which was the same as the one used in Example 1. This single signal was constituted from a recording pulse (irradiation length, 3.7 μm) of alternating seven upward pulses (recording power, 14 mW) each having a width of 76 ns and seven downward pulses (reading power, 0.9 mW) each having a width of 76 ns, and an interval period between the adjacent recording pulses which had a width the same as that of the recording pulse and during which the sample was irradiated at the reading power.

Figure 9:
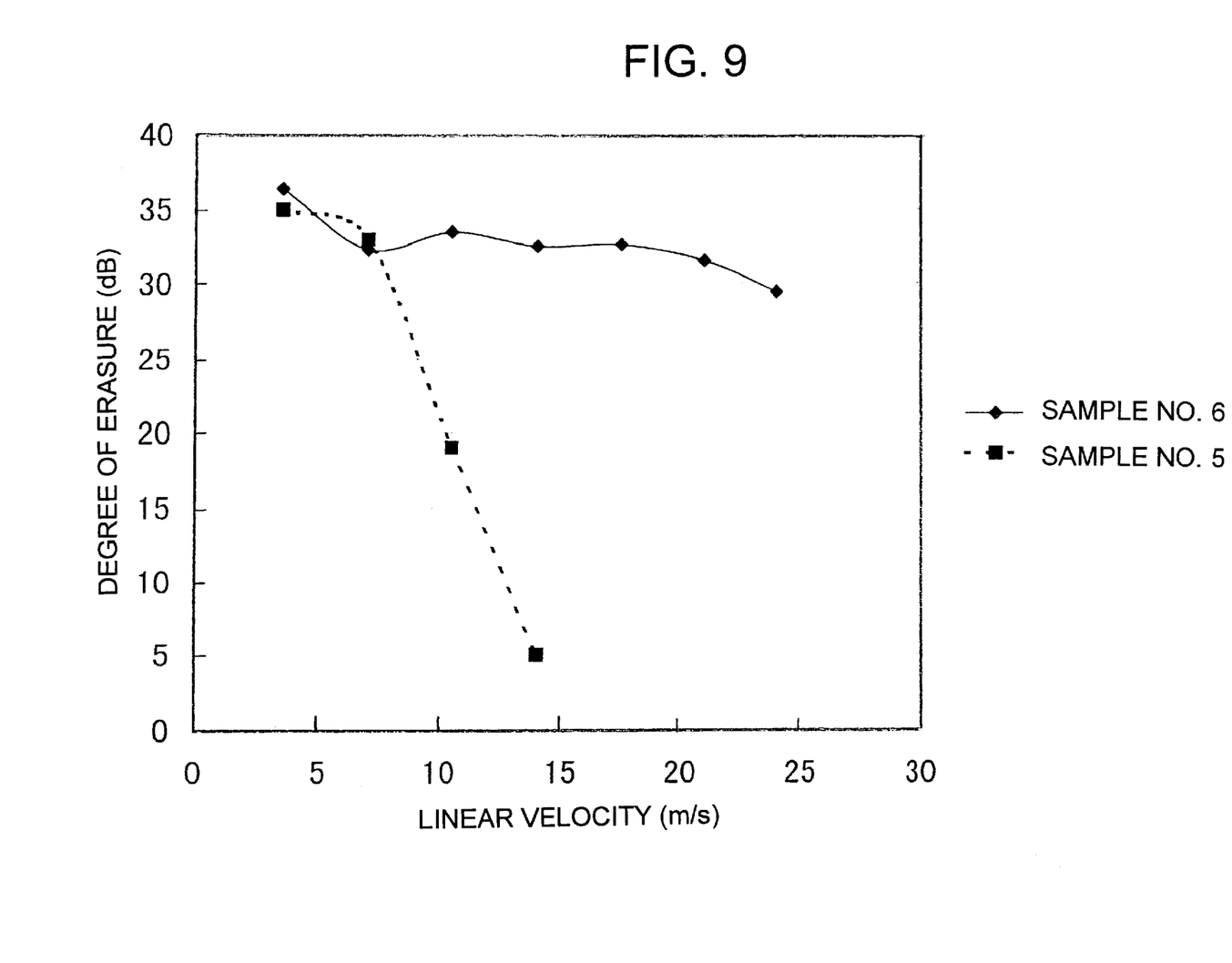
FIG. 9 is a graph showing degree of erasure in relation to the linear velocity of the medium.

The Sample No. 6 which had been recorded with the single signal was irradiated with a laser beam kept at a constant output while rotating the disk at a constant linear velocity to erase the record marks, and the degree of erasure was measured in relation to the linear velocity. Comparative Sample No. 5 produced in Example 1 was also measured in the same way for the purpose of comparison. The results are shown in FIG. 9. It is to be noted that the measurement was accomplished by repeating the measurement at each linear velocity with the laser beam power varied. FIG. 9 indicates the maximum value of the degree of erasure obtained in this measurement. The medium will not be erasable, namely, directly overwritable if the degree of erasure is less than 25 dB.

The merit of the present invention is obvious from FIG. 9. The crystallization of the amorphous record mark is easier than the initialization, and Comparative Sample No. 5 which could not be initialized at the linear velocity of 7 m/s was erasable at the linear velocity of 7 m/s. The erasure, however, could not be completed in Comparative Sample No. 5 at the linear velocity of 10.5 m/s. In contrast, Sample No. 6 could be erased at a linear velocity of more than 20 m/s irrespective of the same composition of the phase change layer with that of the Comparative Sample No. 5. These results indicate that the present invention has enabled overwriting at a high linear velocity which is more than twice higher than that of the conventional disks.

Example 3

Sample No. 7 (Comparative Example)

Sample No. 7 was prepared by repeating the procedure of Sample No. 1 except that the functional layer 42 had a composition of $Al_{50}Sb_{50}$ (atomic ratio). Thermal conductivity of $Al_{50}Sb_{50}$ layer which had been formed to a thickness of 100 nm under the conditions the same as the functional layer was measured to be 0.01 W/cmK.

Evaluation

Figure 10:
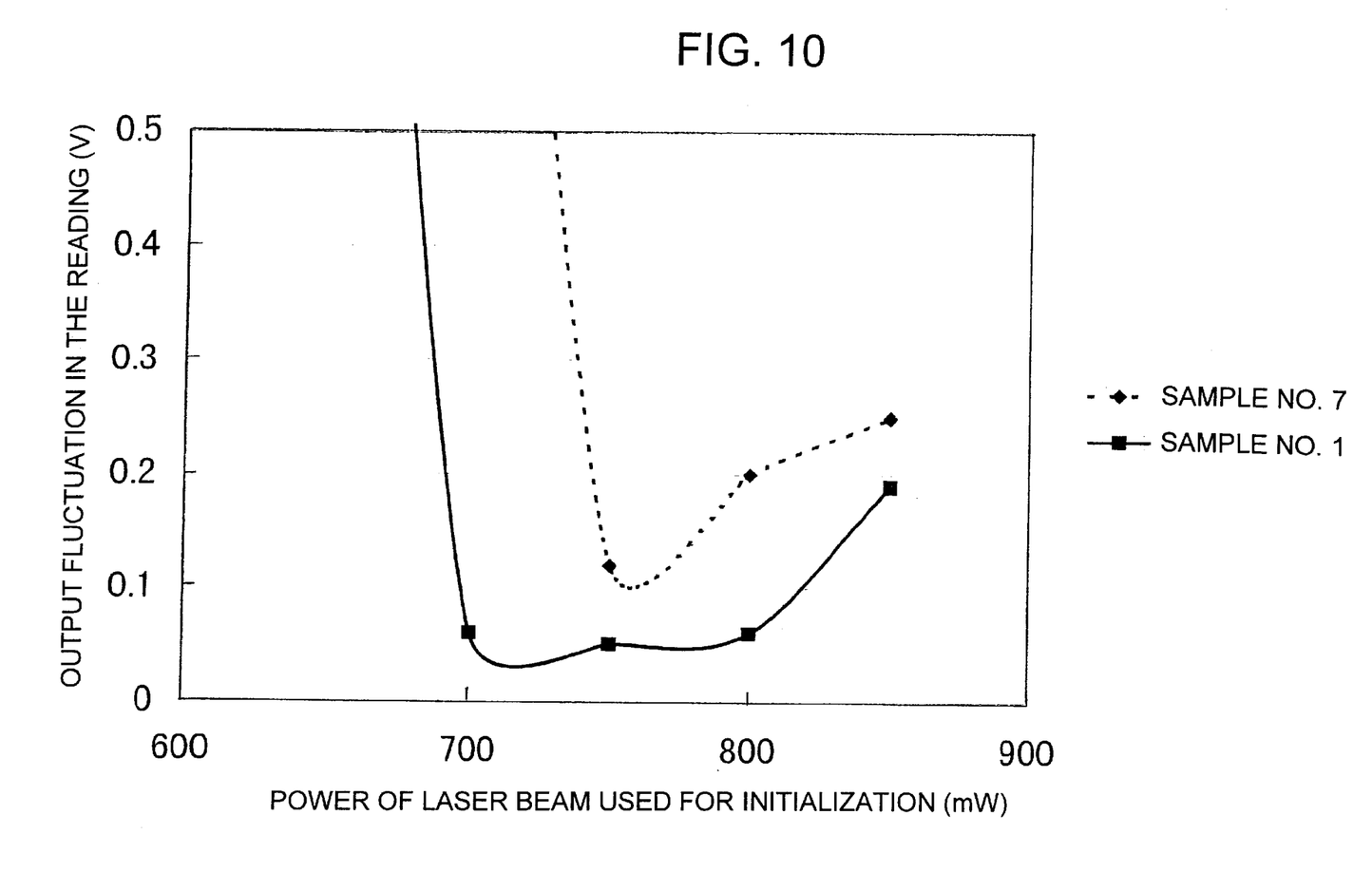
FIG. 10 is a graph showing output fluctuation in the reading in relation to the power of the laser beam used in the initialization.

Sample Nos. 1 and 7 were initialized by using a bulk eraser POP120-3T manufactured by Hitachi, Ltd. with the laser beam of the power shown in FIG. 10 at a linear velocity was 12 m/s, a laser beam spot diameter of 100 μm in radial direction of the sample, and a beam feed rate of 60 μm. It is to be noted that there are some overlapping of the region irradiated by the laser beam under these conditions.

The initialized samples were measured for the output in the reading on the optical disk evaluator as described above by using a reading laser beam at an output of 0.9 mW to thereby evaluate fluctuation of the output in the reading. FIG. 10 shows output fluctuation in the reading in relation to the laser beam power used in the initialization. The output fluctuation in the reading corresponds to the fluctuation of the reflectivity, and the initialization of the phase change layer can be deemed to have been uniform if the output fluctuation in the reading is up to 0.1 V.

The results shown in FIG. 10 indicate that the phase change layer had been uniformly initialized in Sample No. 1 and that such uniform initialization could be accomplished by using the laser beam of broader power range. In contrast, Sample No. 7 was not uniformly initialized, and the range of the laser beam power that enabled reduced output fluctuation in the reading was narrow. As described above, there are some overlapping in the regions irradiated by the bulk eraser, and in the case of Sample No. 7 which has a functional layer with a low thermal conductivity, it is estimated that heat tends to be accumulated near the region of such irradiation overlapping, and as a consequence, matching in the crystallization state becomes difficult between the region of irradiation overlap and other region, inviting an increase in the output fluctuation. In addition, Sample No. 7 could not be initialized at an output of 700 mW, and this indicates that the functional layer of the Sample No. 7 had poor effect of promoting the crystallization.

MERITS OF THE INVENTION

As described above, the medium of the present invention has a functional layer provided in contact with the phase change layer to thereby promote crystallization of the phase change layer.

Japanese Patent Application No. 303674/2000 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An optical recording medium having a recording layer comprising at least one phase change layer and at least one functional layer in contact with said phase change layer, wherein the phase change layer is amorphous in its as-deposited state, and crystals having Fm3m structure or R3m structure are produced upon crystallization of the phase change layer, and the functional layer is crystalline in its as-deposited state containing crystals having Fm3m structure, and the material constituting the functional layer exhibits a thermal conductivity of 0.03 to 5 W/cmK as measured in thin film form of 100 nm thickness.

2. An optical recording medium according to claim 1 wherein said phase change layer has a composition in atomic ratio of:

wherein M represents elements other than Sb and Te, and x and y satisfy the relations:

0.55≦x≦0.90, and

0≦y≦0.25.

3. An optical recording medium having a recording layer comprising at least one phase change layer and at least one functional layer in contact with said phase change layer, wherein the phase change layer is amorphous in its as-deposited state, and crystals having Fm3m structure or R3m structure are produced upon crystallization of the phase change layer, and the functional layer is crystalline in its as-deposited state containing crystals having Fm3m structure, and the functional layer contains at least one element selected from Al, Cu, Ag, Au, Ni, Pd, Pt and Rh as its main component at a content of 60 to 100 atom %, and the functional layer is free from metal elements of Groups 15(Vb) and 16(VIb).

4. An optical recording medium according to claim 3 wherein said phase change layer has a composition in atomic ratio of:

wherein M represents elements other than Sb and Te, and x and y satisfy the relations:

$0.55 \leq x \leq 0.90$, and $0 \leq y \leq 0.25$.

5. An optical recording method for recording the optical recording medium of claim 1, wherein crystalline record marks are formed by irradiating the amorphous phase change layer with a single laser beam whose intensity is modulated.

6. An optical recording method for recording the optical recording medium of claim 3, wherein crystalline record marks are formed by irradiating the amorphous phase change layer with a single laser beam whose intensity is modulated.

7. An optical recording method for recording the optical recording medium of claim 1, wherein amorphous record marks are formed by irradiating the crystalline phase change layer with a single laser beam whose intensity is modulated.

8. An optical recording method for recording the optical recording medium of claim 3, wherein amorphous record marks are formed by irradiating the crystalline phase change layer with a single laser beam whose intensity is modulated.

9. An optical recording medium according to claim 1, wherein the phase change layer has a composition in atomic ratio of: $(Te_{0.26}Sb_{0.74})_{0.9}(Ag_{0.6}In_{0.4})_{0.1}$.

10. An optical recording medium according to claim 1, wherein the material constituting the functional layer has a composition in atomic ratio of $Al_{98}Cr_2$.

11. An optical recording medium according to claim 1 wherein the material constituting the functional layer has a composition in atomic ratio of $Ag_{98}Pd_1Cu_1$.

12. An optical recording medium according to claim 1 wherein the phase change layer has a thickness of more than 4 nm, to 50 nm.

13. An optical recording medium according to claim 12 wherein the thickness is 5 to 30 nm.

14. An optical recording medium according to claim 1 wherein the functional layer has a thickness of 1 to 40 nm.

15. An optical recording medium according to claim 14 wherein the thickness is 2 to 30 nm.

16. An optical recording medium according to claim 1 wherein the functional layer mainly comprises crystals having Fm3m structure wherein (111) face extends substantially parallel with the in-plane direction of the layer.

17. An optical recording medium according to claim 3 wherein the functional layer mainly comprises crystals having Fm3m structure wherein (111) face extends substantially parallel with the in-plane direction of the layer.

* * * * *